United States Patent [19]

Westman

[11] 4,103,288
[45] Jul. 25, 1978

[54] METHOD FOR DATA TRANSMISSION AND A SYSTEM FOR CARRYING OUT THE METHOD

[75] Inventor: Kjell Harry Westman, Vällingby, Sweden

[73] Assignee: U.S. Philips Corporation, New York, N.Y.

[21] Appl. No.: 723,155

[22] Filed: Sep. 14, 1976

[30] Foreign Application Priority Data

Sep. 18, 1975 [SE] Sweden .............................. 7510432

[51] Int. Cl.² .............................................. H04Q 5/00
[52] U.S. Cl. .......................... 340/152 R; 340/147 SY
[58] Field of Search ......... 340/152 R, 147 R, 147 SY; 179/15 AL; 178/2 C, 2 D

[56] References Cited

U.S. PATENT DOCUMENTS

| | | | |
|---|---|---|---|
| 3,564,145 | 2/1971 | Deutsch | 179/15 AL |
| 3,601,806 | 8/1971 | Heimbigner | 179/15 AL |
| 3,632,881 | 1/1972 | Graham | 179/15 AL |
| 4,000,378 | 12/1976 | Caplan | 179/15 AL |
| 4,004,275 | 1/1977 | Arndt | 179/15 AL |
| 4,011,412 | 3/1977 | Mattern | 179/15 AL |

*Primary Examiner*—Harold I. Pitts
*Attorney, Agent, or Firm*—Frank R. Trifari; Steven R. Biren

[57] ABSTRACT

The invention is related to a method for data transmission between a central station and a number of terminal stations being connected to a closed series transmission loop provided between the output and input of the central station, in which the transmission is carried out bit-by-bit in one and the same direction through the loop and under the control of the central station. The invention is further directed to a system for carrying out the method.

16 Claims, 7 Drawing Figures

METHOD FOR DATA TRANSMISSION AND A SYSTEM FOR CARRYING OUT THE METHOD

BACKGROUND OF THE INVENTION

Methods and systems for data transmission by means of a closed transmission loop are known. Prior art within this area is characterized by the fact that it is directed to data transmission on a so called high level, i.e. large data volumes which are transmitted at high bit rates.

Transmission of data from a superior unit to subordinated units of the loop is generally carried out such that the superior unit calls for the subordinated units in sequence and eventually in accordance with a priority order of the sub-units. In this manner a point-to-point connection is provided between the superior unit and the sub-unit, which will then receive the actual amount of information from the superior unit. When this transmission is ended a new point-to-point connection to the sub-unit in turn to be supplied with data is established. Eventually the priority of the sub-units may be renewed after each transmission which is completed. Establishing successively in this manner the different connections will bring with it periods of waiting at the sub-units and therefore make necessary buffer memories of a sufficient capacity at the superior unit as well as the subordinated units.

Transmission in the other direction, i.e. from the subordinated units to the superior unit, is generally carried out such that the superior unit transmits one so called polling character having the task to initiate a connection between the superior unit and subordinated units for which a contact is desirable.

Different methods to obtain this connection are known. According to one known method the polling character is used for the collection of the addresses of the subordinated units for which a contact is desirable. Then the superior unit initiates the establishment of point-to-point connections to the subordinated units in question, and there the connections are eventuallly established in accordance with an actual priority order of the sub-units, which are then allowed to transmit the amounts of data in question.

According to one further known method said polling character is used for the establishment of such a point-to-point connection between the superior unit and the sub-units for which a contact is desirable in the order in which said sub-units are positioned along the loop, said polling character being stored temporarily in the sub-unit during the elapse of time of the data transmission in order to be sent forward on the loop at the end of the transmission and then to initiate the next desirable connection in turn.

From this is clear that transmission in this direction will also bring with it inevitable periods of waiting at the sub-units, the time lengths of which are directly dependent on the actual data volumes to be transmitted. Therefore buffer memories are also required for transmission from the sub-units.

Normally in systems of the type disclosed above relatively large amounts of data are transmitted per transmission. Every transmission is terminated by sending an acknowledgement message from a receiving unit, an acknowledgement character, "ACK-character", being sent in case the data volume transmitted has been received correctly and a "NACK-character" being sent in case the data is received incorrectly. When the transmitting unit receives a NACK character a re-transmission of the data volume is initiated which will bring with it time delays, which particularly in case of large data volumes may amount to values which are important and thereby extend the time of waiting at the different units.

SUMMARY OF THE INVENTION

An object of the invention is to provide a method and a system for the transmission of data information which are suitable on the first hand for transmission by means of a closed loop being arranged so as to connect a number of working place equipments (terminal stations) to a central station, and allowing the working place equipment to be simplified technically to eliminate the need for buffer memories of a larger capacity. One further object of the invention is a system in which the operators of every single terminal station will experience a "permanent contact" with the central station. From the last mentioned requirement it follows that each of the terminal stations should be allowed to transmit and receive at time intervals of a length well below 0.1 s, i.e. the average time required for depressing in sequence two keys of a keyboard.

The object of the invention is achieved by a method in which the above mentioned disadvantages are eliminated and which is characterized in that all data is transferred in the shape of a data message format, in which each of the data messages is composed of at least an address portion comprising a predetermined number of bits indicating in a binary code the address of the terminal station to/from which the data message is directed, and a data portion; in that at least one data message is transmitted from the central station during an output data phase to the terminal stations for which the central station has output data to send; in that each output data phase is terminated by the central station by the transmission of a general polling character preparing for transmission the terminal stations which have input data to send; in that at least one data message is transmitted from each of the terminal stations prepared in this manner during a following input data phase to the central station; and in that a new transfer block is initiated by the central station when the end of the input data phase is sensed, the transfer block comprising an output data phase, a polling control character and an input data phase, in which block the lengths of the output and input data phases are always adapted to the transfer need.

The invention relates to a method and system for data transmission between a central station and a number of terminal stations arranged on a closed loop. The transmission is carried out is series bit-by-bit in one and the same direction through the loop and in control of the central station. All data is transferred in the shape of data messages of a standard length, (e.g. 12 bits), each message comprising an address portion indicating the address of the terminal station to/from which the message is directed, and a data portion comprising an information or control character. The messages are transferred as data blocks consisting of an output data phase during which at least one message is transmitted by central station to the terminal stations for which the central station has output data to send, a general polling character by which each output data phase is terminated and which prepares for transmission the terminal stations which have input data to send, and an input data phase during which at least one data message is transmitted from each terminal station prepared for transmission by the preceding polling character. The central station initiates a new transfer block as soon as the end of an input data phase is sensed, in which block the lengths of the output and input data phases are always adapted to the actual transfer need.

By this methd the loop transmission capacity is always used optimally, that is by activated, terminals only. The delays of the loop are thereby minimized. The waiting periods at the terminal stations may be reduced to such an extent that operators of the system will experience a "permanent contact" to the central station. The circuit arangement of the terminal stations is greatly simplified since there is no need of large capacity buffer memories.

According to one prefereed embodiment the data portions of the messages may be modified by the receiving terminals and forwarded to the loop to be rejoined with belonging address portions and sent back to central stations without breaking the continuity of the bit sequence on the loop, thereby eliminating the need of sending separate acknowledgement signals.

The receiving stations may, during a next following transfer phase, send a particular control character after having detected a parity error of a received message, which character will initiate a repeated transmission of an actual message during next transfer phase, thereby eliminating the need repeated transmission of large data volumes.

The method according to the invention brings with it the important advantage that the transmission capacity of the loop is always optimally used, i.e. by the activated terminal stations only, and thereby the delays of the loop are minimized.

One preferred embodiment of the method according to the invention is characterized in that during the output data phase each of the output data messages, after the data portion thereof has been modified by the receiving terminal station, is sent forward in the loop and back to the central station, in which said modification is carried out without breaking the continuity of the message bit sequence appearing on the loop. By modifying in this manner the output data message in the receiving terminal station the need of transmission of a separate acknowledgement message (ACK-signal)back to the central station is eliminated. This modification can in particular be obtained by inversion of all the bits of the data message or changing of the parity bit so as to indicate whether or not the terminal station is prepared to receive output data during the next following output data phase and that the remaining bits of the data portion are inverted, or by replacement of the data portion of the data message by new input data.

When detecting a parity error of a data message the receiving station will according to the invention transmit during the next following transfer phase (output data phase or input data phase) a particular control charaxter (NACK), which will initiate a repreated transmission of the actual data message during the next following trasfer phase. In this manner repeated transmissions of large data volumes and following time losses are prevented.

A further preferred embodiment of the method is characterized in that the central station is arranged to transmit a continuous sequence of synchronizing control characters (SYN), when there is no other transmission, in which the sequence of synchronizing control characters is used as a filling for the line delay of the transfer loop, and in that the central station will initiate transmission of the next following output data phase after having received one of said synchronizing control characters which has circulated on the loop.

Still a further preferred embodiment of the method is characterized in that each of the terminal stations not recognizing with a predetermined regularity the polling character (Q) or one of the synchronizing control characters (SYN) being transmitted at each transmission block by the central station will fall out of synchronism and thereafter await a new synchronization by the synchronism control characters which are transmitted by the central station in connection with the next following transfer block.

A system for carrying out the method according to the invention is characterized in that each of the terminal stations is provided with a controllable 2-position switch in a first position of which the terminal station is bridged and in a second position of which a transmission register or, alternatively, a modification circuit is connected in series with the loop, and a decoding and timing circuit being arranged so as to generate by decoding the contents of an input register, being connected permanently to the loop, and by recognizing the symbols appearing on the loop control signals for the control of the terminal station during an output data phase and an input data phase.

A preferred embodiment of the system is characterized by that the decoding and timing circuit (DT) is arranged so as to generate during an output data phase after recognizing the address of the terminal station a first control signal for changing the 2-position switch to the second position thereof (ADREC, OR3, SW) so that the loop is opened and the dàta portion of the data message is supplied to a reception register (DOUT) thereof, said data portion being simultaneously passed through said modification circuit and rejoined to the address portion on the loop, and to generate at the end of the data message a second control signal (E12BT) resetting the 2-position switch to its first position (1) via control members (OR4) comprised therein.

A further preferred embodiment of the system is characterized in that each of the terminal stations is provided with means (RNE) for generating a status signal which is high or low dependent on whether or not the transmission register (DAT IN) holds a data message, in that the decoding and timing circuit (DT) is shaped so as to when receiving a polling control character (Q) generate a third control signal (Q) which in combination with a high status signal and via control means (AND6, OR3) will change the 2-position switch (SW) to the second position (2) thereof and connect the transmission register in eries with the loop via connection means (AND7, OR5), and in that further control means (INV,OR4) are provided for generating after the transmission register (DAT IN) has been reset (SS, RT) a control signal resetting the 2-position switch to the first position (1) thereof.

Yet another preferred embodiment of the system has the characteristic that each of the terminal stations is provided with a parity check circuit (PCK) for a parity check of the contents of the reception register (DOUT), control means (AND2, RD), which when the parity check is acknowledged (OK) will supply the contents of the reception register (DOUT) to reception means provided for this purpose in the terminal, and which when the parity check is not acknowledged will initiate a supply of a no-acknowledgement signal (NACK) to the transmission register (DAT IN) to be sent as an input data message during the next following input data phase.

Another preferred embodiment of the system is characterized in that each of the terminal stations is provided with a synchronization check circuit (SYN CK) being arranged so as to dependent on output signals (Q, SYN) from the decoding and timing circuit (DT) check if the polling character or the synchronizing control character is received at a predetermined minimum frequency in the input register (IREG), and to take the terminal out of synchronism when this is not so and then to reset the relevant registers of the terminal.

A further preferred embodiment of the system is characterized in that the central station is provided with a control unit (CO) being arranged so as to control the transmission of information or control characters dependent on information which is received from the loop via an input (RE), a synchronizing generator (SYN-GEN) which is controlled by the control unit, and a polling character generator (QGEN) which is controlled by the control unit, the output of said generators being connected together with the output of an output data buffer register (ODBR) to the output (TR) of the central station via a transmission gate (OR1).

A further preferred embodiment of the system is characterized in that the central station is provided with a decoding and timing circuit (DTI) for the control of the information received from the loop (RE), in which the decoding and timing circuit will generate a first enabling control signal to a first gate member (AND9) at the reception of output data messages which have circulated the loop while being modified by the actual terminal stations, and second enabling control signal to a second gate member (AND8) at the reception of input data messages from the terminal stations.

Still a further preferred embodiment of the system is characterized in that the decoding and timing circuit (DT1) of the central station is arranged to generate when recognizing a synchronizing control character in the input data buffer register (IDBR) a control signal by which the control unit (CO) is brought to start the output data phase of the next following transfer block.

BRIEF DESCRIPTION OF THE DRAWINGS

One embodiment of the invention will be described below with reference to the drawings, in which.

DETAILED DESCRIPTION

Figure 1:
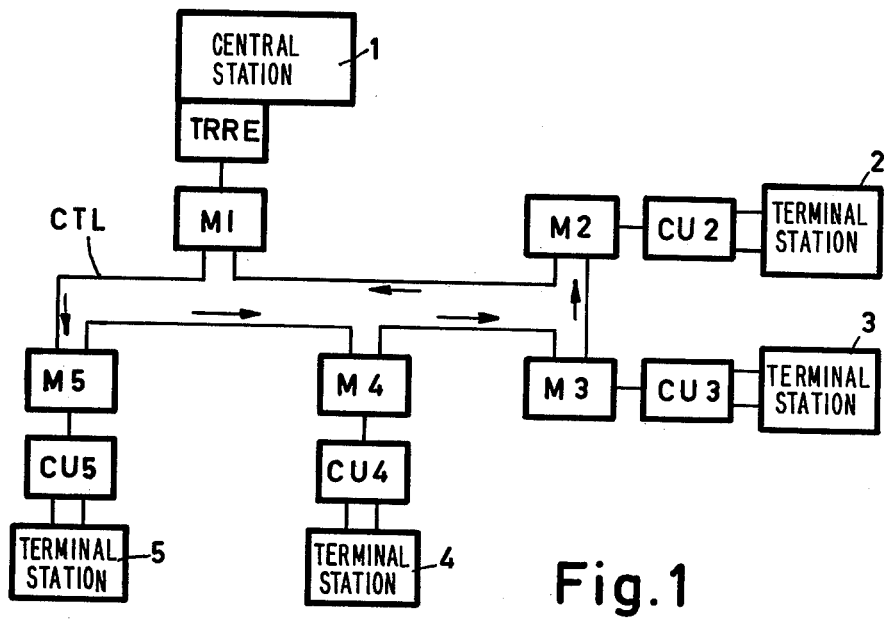
FIG. 1 discloses a general circuit diagram of a transmission system according to the invention.

In FIG. 1 is disclosed a general circuit diagram of a closed series transmission loop CTL the output and input of which are connected to a central station 1 via a belonging modem M1 and a transmission/reception circuit TRRE, respectively. To the loop are connected four terminal stations 2, 3, 4, 5 via the belonging modems M2, M3, M4 and M5, respectively, and the belonging connection units CU2, CU3, CU4 and CU5, respectively. The transmission system is on the first hand intended for communication on working place level, i.e. between working places and a data processing equipment which is centralized. From this follows that a terminal station (working place equipment) is normally provided with a keyboard and a printer, which via connection units are connected to the loop. The central station in its turn is normally provided with a computer by means of which connections may be established between each of the working places and the superior, centralized data processing units.

In FIG. 1 the terminal stations are connected to the loop via modems. Said modems may be provided or not dependent on the shape of the loop. If the loop is arranged within a limited geographical area and is used e.g. to interconnect a number of terminals within the one and same building or a number of buildings in a city the modems may eventually be eliminated due to the short distances of transmission between the terminals.

The central station of the loop and also the modems and the equipments of the terminal stations may be structured in different ways which are known and which are not important for a correct understanding of the invention. For this reason, said units are not described further in the following.

Figure 2:
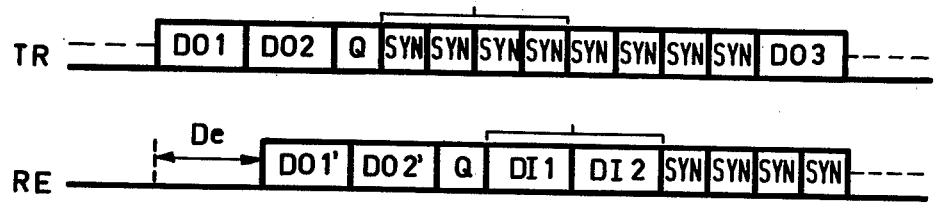
FIG. 2 discloses an example of a message sequence appearing on the loop.

All data transmission in the loop is carried through bit-by-bit in one and the same direction. The transmission direction may be for example the one which is indicated by the arrows in FIG. 1. During transmission, message sequences of the type disclosed in FIG. 2 appear on the loop, and the message sequence TR represents the bit sequence which is occasionally transmitted from the central station, and RE represents the bit sequence which after a delay time corresponding to the line delay De of the loop is received by the central station.

The bit sequence on the loop consists of data messages and different control characters. The sequence TR is composed of an output data phase during which output data is supplied by the central station to, in the actual case, a first and a second terminal station on the loop. The output data phase is terminated by a polling character Q and thereafter the central station changes to the transmission of a continuous sequence of synchronizing control characters SYN.

The data messages DO1 and DO2 are received by the actual terminal stations and are simultaneously re-transmitted by said stations after being modified to DO1' and DO2', respectively, and as is clear from the sequence RE said modified messages will reach the central station after an elapse of time corresponding to the line delay.

The terminal stations having input data to send are prepared for transmission during an input data phase by said polling character. In the actual case two terminal stations have input data DI1 and DI2, respectively, to send. The Q character is followed immediately by the input data phase and with respect to the bit sequence appearing on the loop the consequence of said transmission is that a corresponding number of SYN-characters supplied from the terminal station are replaced by the input data characters DI1 and DI2. The SYN character appearing after DI2 which is received by the central station after being circulated on the loop will indicate the end of the input data phase and thereafter the next following output data phase is started immediately.

An output data phase, a polling character, and an input data phase are included in a transmission block in which the lengths of the output and the input data phases are always adapted to the actual need, i.e. independent of the number of receiving and transmitting terminal stations.

Figure 3:
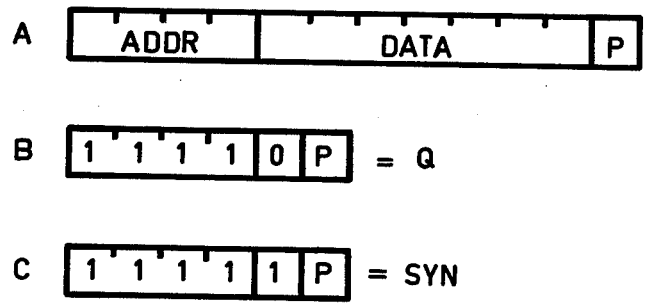
FIG. 3 discloses the structure of the different data characters used.

In FIG. 3 is disclosed the structure of the different data characters appearing on the loop. The shape of a data message format according to the invention is disclosed by A. In the actual case a standard length of 12 bits has been used. A data message DO or DI is always composed of an address portion ADDR and a data portion DATA. The address portion is composed of four bits and therefore $2^4 = 16$ different addresses are made possible. If the bit combinations 1111 (which is used for another purpose described below) is neglected 15 different terminal stations may be addressed. The data portion is composed of eight bits of which seven are the information bits and is terminated by a parity bit. From this follows that the data portion is composed of a data character of the usual length of seven bits.

The structure of the polling character Q is disclosed at B, and in the actual case said character is composed of the bit sequence 1111OP, in which a parity bit is indicated by P. The shape of a synchronizing character SYN is disclosed at C, and the bit contents thereof is 11111P. The Q character and the SYN character are both composed of six bits, that is half the bit number of a data message according to A, from which follows that two SYN characters are replaced by one input data message during the input data phase.

In the actual embodiment of the system according to the invention a way of operation has been choosen from which follows that all units of all the terminal stations connected to the loop after a start sequence comprising a number of SYN characters are assumed to be in synchronism, and that every terminal station which does not recognize the Q character or the SYN character at least once per 16th character of the message bit sequence will fall out of synchronization and await thereafter new synchronization. To obtain such a synchronization at least two SYN characters in sequence are required. Since SYN characters are transmitted as a filling for the line delay as mentioned above, synchronization will be achieved immediately after the end of the next following input data phase.

The way of operation selected brings with it that the length of both the output data phase and the input data phase will be limited to 15 data messages i.e. a maxium of 30 data messages per transfer block.

The address part of the data message makes possible, as mentioned, that 15 terminal stations may be addressed, and in a loop having this number of terminal stations it follows from the limit of 30 data messages per block that the output data phase and the input data phase, respectively, may each comprise one data message directed to and from, respectively, each of the terminal stations.

The limitation to one data message to and from, respectively, a given terminal station during a transmission block is in correspondence with the normal way of operation of the system. If the loop is provided with a number of terminal stations which is below 15 and if furthermore a given terminal has a high factor of utilization, e.g. due to special tasks of operation, it is, however, by the method according to the invention possible to give this terminal station such priority that it is allowed to receive and transmit, respectively, a number of characters within each transfer block.

Factors limiting the transmission capactiy of the system calculated in blocks/s are the length of the loop, (measured in $m \times 10^4$), obtainable bit rates in Baud, and the number of modems of the loop, where it should be observed that several terminal stations may be connected to the loop via the one and same modem, for which there may furthermore be assumed an average delay of 2 ms. The number of blocks/s is furthermore dependent on the number of messages (DO and DI), respectively, within the blocks. The transfer capacity TC measured in number of blocks/s may be obtained from the equation below:

$$TC = \text{bit rate}/(\text{number of } DO/DI) \times \left\{ 12 + 6 \times \left[ 2 + \text{integer part of} \left( \frac{\text{modem} \times 2 + \text{line length}/3}{5 \times 1200/\text{bit rate}} + 1 \right) \right] \right\}$$

Therefrom may be obtained a transfer capacity which is exemplified in the table below for different values of the actual parameters.

|  | Number DO/DI | Baud | |
|---|---|---|---|
|  |  | 1200 | 2400 |
| 2 MODEM | 1 | 33 | 57 |
|  | 2 | 25 | 44 |
|  | 4 | 17 | 31 |
| $3 \times 10^4$ m | 6 | 12 | 23 |
|  | 8 | 10 | 19 |
| 4 MODEM | 1 | 28 | 50 |
|  | 2 | 22 | 40 |
|  | 4 | 15 | 29 |
| $6 \times 10^4$ m | 6 | 12 | 22 |
|  | 8 | 9 | 18 |

From the table it is obvious that an average transfer capacity of about 20 blocks/s is achieved at the lower bit rate of 1200 Baud with the given values of the parameters, i.e. a transmission time of 1/20 s per block. From this follows that the operator will experience "permanent contact" with supervisory units since a depression of a key of a keyboard will normally required a time of 1/10 s.

Figure 4:
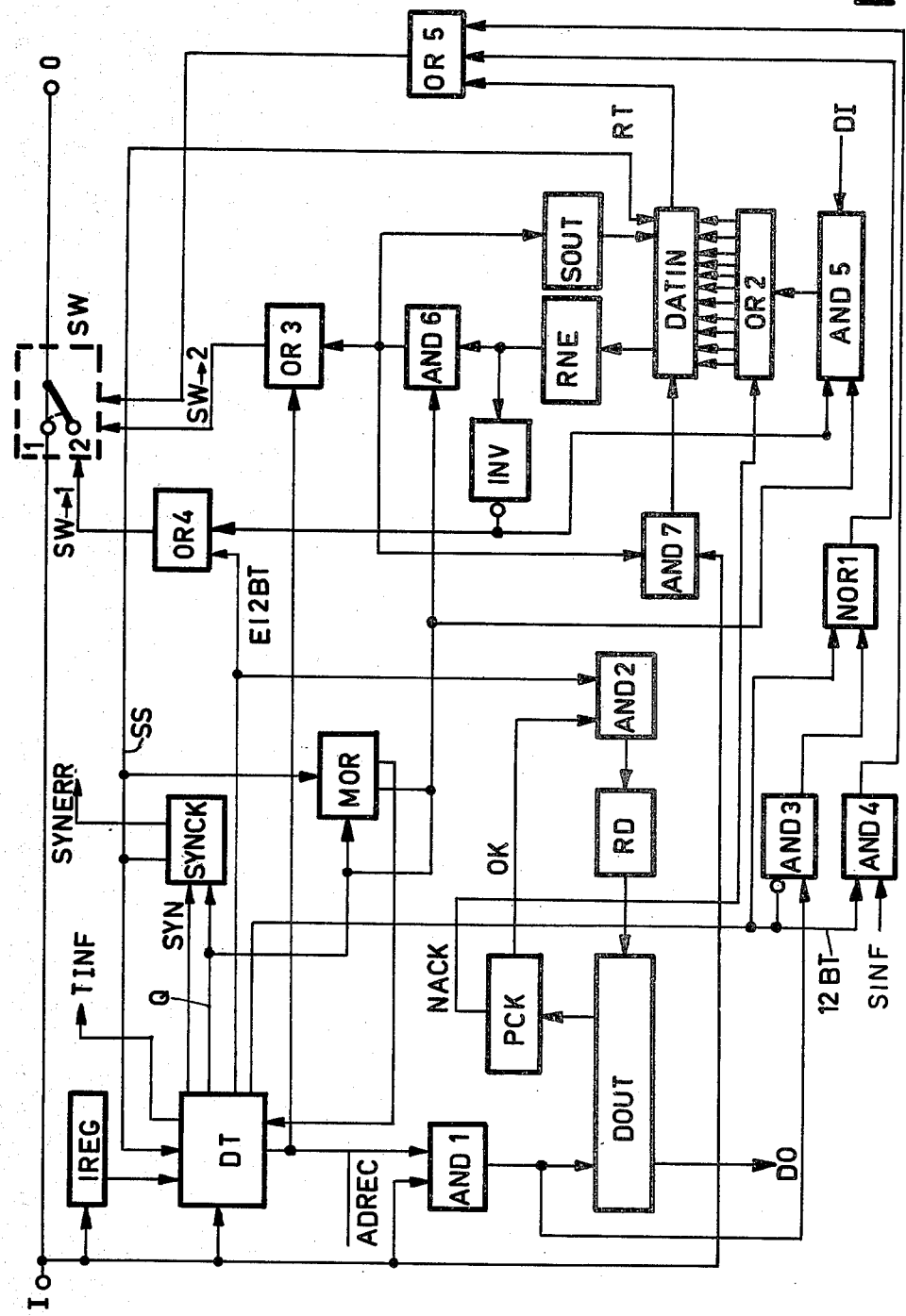
FIG. 4 discloses the circuit diagram of an embodiment of a connection circuit by which a terminal station is connected to the transmission loop or, alternatively, to a belonging modem.

In FIG. 4 is disclosed the circuit diagram of the connection circuit CU arranged between a terminal station and the loop or alternatively between a terminal station and a modem. Data will be supplied to the circuit at I and will leave the same at O. The line provided between I and O therefore represents a section of the transmission loop, and in this section is provided a 2-position switch SW, in a first position 1 of which the terminal station is bridged and in a second position 2 of which a transmission register DATIN is connected in series with the loop.

On the input the circuit is provided with five parallel inputs. The first one of said inputs is connected to an input register IREG having the capacity of six bits. IREG should store temporarily the address part of a message, a SYN character or a Q character, alternatively, in order to make possible a decoding operation of the same by means of a decoding and timing circuit DT which is connected to the output thereof.

The circuit DT is composed of decoding and timing circuits which will be described with reference to FIG. 6, and is provided with a first input connected to I in order to generate from the signals received the time control signals which are necessary and which are distributed from the output TINF to the relevant circuits. It may be mentioned as an example that this time control information is used for advancing the different registers of the connection circuit and the rest of the terminal station.

A second input of the circuit DT is supplied with information from IREG holding always the last six information bits appearing on the loop. The contents of IREG is decoded by a decoder of DT which dependent on the result of the decoding operation will supply an output signal to any of the outputs ADREC, SYN or Q. If the address of the terminal station is detected by the decoder the output ADREC will consequently be activated such that a high output signal is supplied to the AND gate AND1 the second input of which is connected to I. By this measure it is made possible that the data portion which folows the identified address portion may be read into a reception register DOUT which is connected to the output of AND1. The output signal ADREC is used for activating simultaneously the OR gate OR3, the output of which is connected to a control input of the switch SW which is thereby changed over to the position 2 so that the loop is opened.

Each of the information bits fed into DOUT is supplied simultaneously to a logic circuit comprising an AND gate AND3 connected in series with a NOR gate NOR1 the output of which is connected to the output end O of the disclosed loop section of the loop, which is opened at this stage, through the OR gate OR5 and SW. Said logic circuit is provided in order to feed forward to the loop the 7 bits of the data portion in its inerted form, but the number eight bit, the parity bit, should be blocked. Therefore the data portion is supplied to an input of AND 3 while an inverting input of AND3 is supplied with a time control signal from DT, said signal being denoted 12BT and the shape of which is such that it is low during the first 11 bits of a data message and high during the 12th bit. The output of AND3 is connected to an input of NOR1 the other input of which is supplied with the signal 12BT. Thereby is achieved that NOR1 will supply at its output the inverted data portion and alway a O instead of the parity bit.

In this embodiment a mode of operation is used according to which the terminal station will feed forward the data message with its data portion inverted apart from the parity bit which is blocked. In place of the parity bit is inserted a status information bit denoted status inf. disclosing the operation status of the terminal station. Said status inf. bit may for example be equal to a 1 if the terminal station is prepared to receive a further data message during the next following output data phase and a O if the station is not prepared thereto.

The status inf. bit SINF is supplied from a specially adapted circuit of the terminal station and is supplied to the one input of the AND gate AND4, the second input of which is supplied with said 12BT signal from DT. The output of AND4 is connected to an input of OR5 and from this it follows that the loop is supplied with a status information bit during the 12th bit interval of the message.

The data message may be modified differently before it is fed forward on the loop which has been indicated above, and for example a situation according to which all the bits of the data portion are fed forward after being inverted may be realized by replacing AND3, NOR1 and AND4 by an inverting AND gate the one input of which is supplied with the output signal from AND1 and the second input of which is supplied with a high output signal referred to as bit 5-11 (in FIG. 6) from DT during the total number of bits of the data message.

Returning to the circuit, DT is furthermore provided with an output SYN which is connected to a synchronization check circuit SYNCK. The SYN output is activated when a SYN character of IREG is detected by the decoder comprised therein.

The circuit SYNCK will be described in greater detail with reference to FIG. 6 and comprises a counter which after the reception of two SYN characters in sequence will activate an output denoted SS.

The circuit DT is furthermore provided with an output Q which is likewise connected to SYNCK and which is activated when a Q character of IREG is detected by DT. If neither the Q output nor said SYN is activated at least once per 16th data message further counter means in SYNCK will activate an output SYNERR. When this output is activated it is indicated thereby that the terminal station has fallen out of synchronism. The signal SYNERR is used for resetting the actual registers of the terminal station and the connection circuit.

Said output SS is connected to a control input of DT and thereby this circuit is blocked when the level of SS is low.

The signal at output SS is used also for setting a first stage of a two stage operation mode register MOR. The output of said first stage is connected to DT and the output signal must be high in order to make possible an activation of this circuit in a reception mode. The SS signal is used also for resetting the register DATIN via the RT control input thereof before supplying thereto an eventual input data message to be sent during the next following input data phase, said reset operation being used also for switching back SW to the position 1 via the signal path RNE, INV, OR4.

As mentioned above the input data phase is always preceeded by a Q character which will activate the Q output of DT, said output being connected to the second stage (the transmission mode stage) of the register MOR. In order to eliminate a delay of the information in this stage the input as well as the output thereof are connected to an input of an AND gate AND6 the second input of which is connected to a detection circuit RNE, which is arranged so as to detect whether or not there is an information in the register DATIN. Said detection circuit will supply an output signal in case an information is kept in DATIN. This output signal is combination with the output signal of the transmission mode stage of the register MOR will, in case of an information content in DATIN, activate the gate AND6 which in turn via OR3 will initiate the switch SW to take the position 2. The output signal from AND6 is used also for the activation of a shift pulse generator SOUT provided for the register DATIN.

Above has been described the operation of the connection circuit during a reception as far as to the moment when the data portion is fed into the register DOUT while it is simultaneously retransmitted on the loop via AND3 and NOR1. After the data portion has been supplied to DOUT two situations are possible, i.e. on the one hand that the data portion has been received correctly and on the other hand that it is not correct.

The first situation will bring with it the activation of a parity check circuit PCK which is connected to the register, which circuit will then supply an acceptance signal OK to one input of an AND-gate AND2 the second input of which is supplied with the timing signal E12BT (end of 12th bit) from DT. Said two signals will activate AND2 and the output signal thereof will activate the readout circuit RD which is connected to a control input of DOUT. The circuit RD will supply readout signals to DOUT in control of the signal TINF. inf. from DT. The data portion DO fed out in this manner is received in registers of the terminal station provided for this purpose. The signal E12BT (end of 12th bit) is used also for resetting the switch SW to the position 1 via the OR circuit OR4 in order to again close the loop.

The second situation will bring with it the generation of an error signal NACK by the circuit PCK, which signal via the OR circuit OR2 is supplied in parallel into the register DATIN in order to be transmitted as an input message during the next following input data phase, the address of the terminal station being comprised in said NACK signal so that a complete input data message will be fed into DATIN.

At the transition to the next following input data phase DATIN already holds an input data message in shape of said NACK character, which is detected by RNE the output of which is supplied to one input of AND6, the other input of which in this situation is supplied with the signal Q from MOR, and thereby is obtained a change of the switch SW to the position 2 via OR3. The output signal from RNE is via an inverter INV supplied also to one input of an AND gate AND5 provided for the control of the supply of input data from the terminal into the register DATIN via OR2. Since INV in this case will supply a 0 the supply via AND5 of an evantual input data character into DATIN is prevented. From this follows that the NACK character will be transmitted as an input data character during the input data phase.

Normally, when an OK signal is supplied by PCK, eventual input data from the terminal should be fed into DATIN via AND5. In this situation there is no information in DATIN and therefore a high output signal will be supplied to AND5 by INV. Input data may be supplied via AND5 and OR2 into DATIN when the Q signal is received.

OR2 is connected to parallel inputs of DATIN and is composed of the same number of OR gates as the number of bits of the data message, i.e. 12. Similarly AND5 is composed of 12 AND gates each of which is connected to a belonging OR gate of OR2.

Consequently, during the elapse of the last bit time of the Q-character the following will take place in the circuit. A high signal Q initiated by the Q signal is supplied to one input of AND5, a second input of AND5 is supplied with a high signal from INV since DATIN is empty and since a O is supplied from RNE, AND5 will be conductive and an input data message will be supplied in parallel into DATIN via OR2, and RNE will detect the contents of DATIN and change the switch SW to the position 2 via AND6 and OR3.

During the input data phase the contents of DATIN should be supplied in series to the loop via OR5 and SW while DATIN is simultaneously supplied with an information or control character from the nearest preceding terminal station on the loop which is activated or the central station. Therefore an AND gate AND7 is provided with one input connected to the output of AND6 the output signal of which indicates that an input data message is kept in DATIN and that an input data phase is in question, and a second input of which is connected to the loop at I. The characters appearing on the loop at I are therefore supplied bit-by-bit via AND7 into DATIN and at the same time the contents of DATIN is fed forward to the loop at O via OR5 and SW.

At the terminal four different modes of operation may appear during the transmission of a block on the loop, i.e. no information is received or transmitted by the terminal, information is received only, information is transmitted only, and information is both received and transmitted.

In the first mode SW will maintain its position 1 during the output data phase since the terminal address is not identified by DT, and during the input data phase SW will maintain its position 1 since there is no input message in DATIN and since consequently the output signal of RNE is low and may not influence SW via AND6 and OR3.

In the second mode the terminal address is identified by DT during the output data phase and an output signal is generated which via OR3 will change SW to the position 2 after reception of the address portion. The data portion will be put into DOUT via -AND1 and simultaneously the 7 information bits of the data portion will be inverted by AND3 and NOR1 and fed forward to the loop via OR5 and SW. The parity bit is blocked in NOR1 and is replaced with a status inf. bit which is sent via AND4, OR5, SW. After the last one, the 12th bit of the received output data message SW is changed to the position 1 by the signal E12BT (end of 12th bit) via OR4, and this signal will simultaneously initiate via AND2 a read out of DOUT when presumed that the parity check has initiated a generation of the acceptance signal OK. When there is a parity error a NACK message is supplied into DATIN as has been described.

In the third mode SW will maintain the position 1 during the output data phase. As a result of the character Q input data is supplied to DATIN via AND5 and OR2 and the data message supplied will be detected by RNE which will initiate a change of SW to the position 2 via OR3. The following bits on the loop will pass by the connection circuit via 1, AND7, DATIN, OR5 and SW, and will at the same time initiate transmission of the contents of DATIN.

In the fourth mode, when the terminal will both receive and transmit information, the operation is in accordance with a combination of the modes two and three described above.

Figure 5:
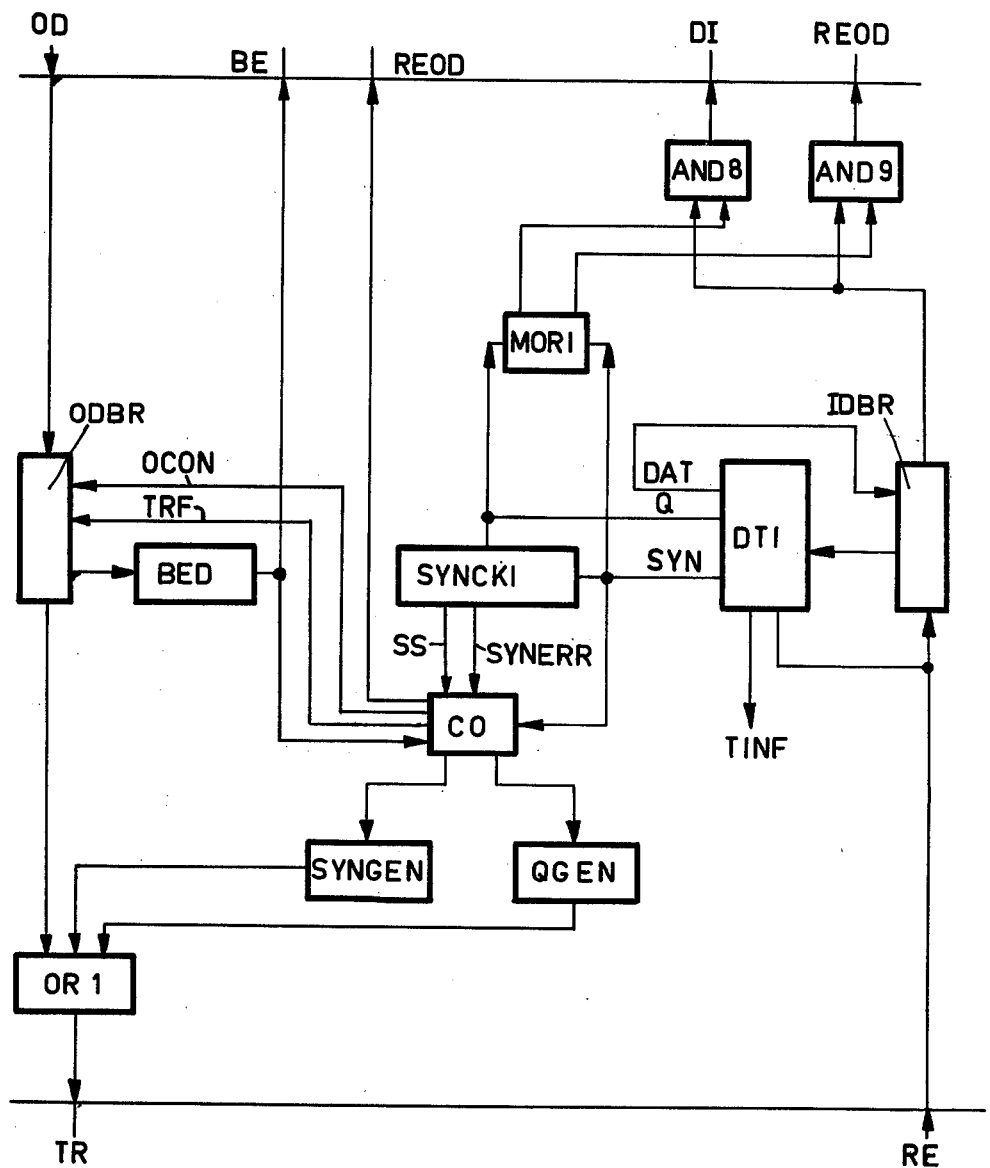
FIG. 5 discloses the circuit diagram of an embodiment of the transmission/reception circuit by which the central station is connected to the loop.

In FIG. 5 is disclosed an embodiment of the transmission/reception circuit TRRE, through which the central station 1 (TC) (FIG. 1) is connected to the series transmission loop. The horizontal line at the top of the figure represents the border line with respect to the central station 1 with the signals shown which are interchanged between TRRE and TC. The horizontal line at the bottom of the figure represents the border line with respect to the transmission loop with the appearing signals shown, i.e. the transmission sequence TR and the reception sequence RE.

TRRE is composed of a central control unit CO, in which is comprised control circuits of a type well known by those skilled in the art in order to initiate transmission of synchronizing characters from a synchronization generator SYNGEN which is connected thereto via an output-OR-circuit OR1 onto the loop, and in order to initiate correspondingly a transmission of a polling character Q from a generator QGEN. One further control signal output of CO is provided so as to supply an output command signal OCON to an output data buffer register ODBR. One further control signal output of CO is provided so as to supply a "ready for output of data" signal, REOD, to superior means of the central station. Via an input, CO is supplied with a signal BE supplied by a buffer-empty detector BED, which for the buffer register ODBR indicates that the buffer register is empty and ready for receiving a new output data message OD from the central station. The signal BE is also supplied to units comprised in the central station.

On the input side TRRE comprises a central control unit CO to be described in more detail with reference to FIG. 7 and is furthermore provided with a decoding and timing circuit DTI of a type which corresponds to the circuits provided in the terminal connection units CU. One input of DTI is supplied with the sequence RE in order to generate therefrom the necessary timing informating which is supplied on the output TINF to the relevant circuits. The sequence RE is simultaneously supplied into an input data buffer register IDBR.

Characters supplied into IDBR are decoded in DTI which dependent on the result of the decoding operation will activate any one of its output DAT, Q and SYN when it is revealed by the decoding operation the reception of a data character, a polling character Q, and a synchronizing control character SYN, respectively.

The signal SYN is supplied to a synchronizing check circuit SYNCKI one further input of which is supplied with the Q signal from DTI. Said SYNCKI circuit is of a form corresponding to the circuits SYNCK which form part of the CU's. This circuit generates an out signal SYNERR which is supplied to CO if the input Q or SYN is not activated at least once per 16th character received. When the character SYNERR is received, CO will initiate a new synchronization procedure on the loop.

The Q signal and the SYN signal from DTI are also supplied separately to a belonging position of an operation mode register MORI. When the Q signal is detected in DTI the Q output is activated and will activate in turn the Q stage of MORI, the output signal of which will thereby be high and make possible supply of input data DI in the central station from IDBR via an AND gate AND8. When instead the signal SYN in detected in DTI the SYN output thereof is activated, and thereby the SYN position of MORI is activated and will then supply a high output signal to an AND gate AND9, allowing thereby in the central station input of data denoted with REOD from IDBR, said data being output data which has been circulated on the loop and which has then been modified in a relevant connection circuit CU and the parity bit of which indicates whether the actual terminal station is prepared or not to receive further output data during the next following transfer block.

In order to prevent the central station from supplied with information from IDBR which is not desirable, i.e. Q and SYN characters, IDBR is supplied with the signal from the output DAT of DTI which is activated when data different from control characters is in question.

Figure 6:
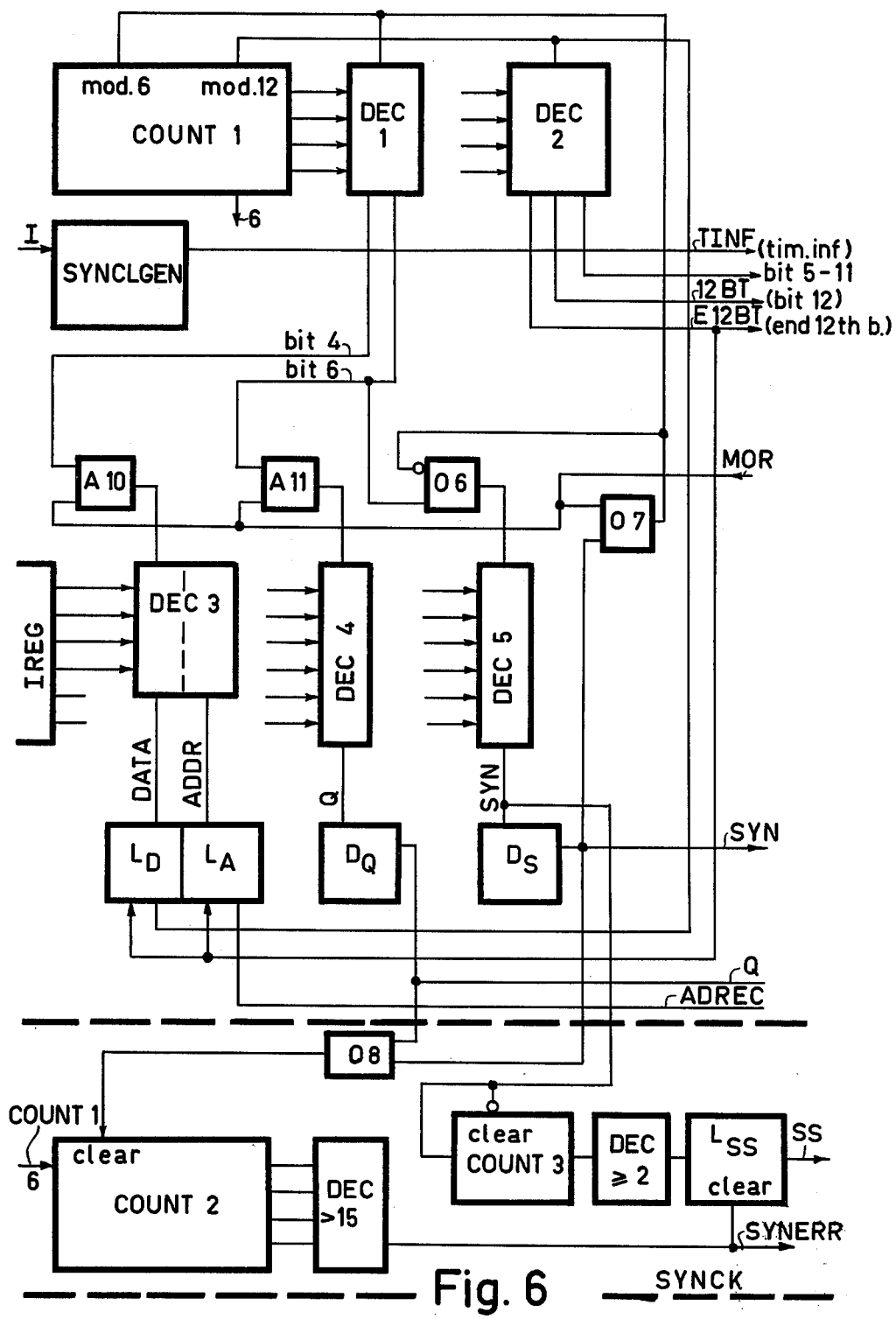
FIG. 6 discloses a circuit diagram of a decoder/timing circuit and the synchronization check circuit connected thereto used in the connection circuit of each terminal station and the transmission/ reception circuit of the central station.

In FIG. 6 is disclosed a circuit diagram of the DT, DTI respectively, circuit comprised in the connection circuit (FIG. 4) of each terminal and in the TRRE circuit of the central station (FIG. 5).

The timer part of DT, DTI is composed of the following components: a 4 bit counter COUNT1 which may count according to a modulo 6 or a modulo 12; a decoder DEC1 which in module 6 will generate output signals (bit 4 and bit 6) at the 4th and 6th steps of COUNT1; a decoder DEC2 which in module 12 will generate a first output signal (bit 5-11) from bit 5 to bit 11 inclusive, a second output signal (bit 12) and a third output signal (end 12th bit) at the back edge of bit 12.

COUNT1 is locked in its initial position in case no one of signals mod 6 and mod 12 is active. If mod 6 and mod 12 are both active mod 12 is valid.

The timer part further comprises a clock generator SYNCLGEN which is synchronized to the time pattern of the bit stream received at I. The detailed construction of the clock generator must be adapted to the selected type of digital circuits.

The decoder part of DT is composed of the following components: a decoder DEC3 connected to the four bits of IREG in which the address portion of a transmitted data character is allocated; a decoder DEC4 connected to all six bits of IREG; a decoder DEC5 likewise connected to all six bits of IREG; necessary control logic (A10–11) of decoders DEC3, DEC4, DEC5; necessary latches $L_D$ and $L_A$ of the decoder DEC3; and two D flip-flops $D_Q$ and $D_S$ provided at the outputs of DEC4 and DEC5; respectively.

For clearness' sake FIG. 6 also disclosed an embodiment of the SYNCK circuit which is supplied with the signals Q and SYN from DT. SYNCK is composed of a counter COUNT2 connected to the output 6 of COUNT1; a decoder DEC > 15 connected to the output of COUNT2; and OR-gate 08 connecting the outputs of flip-flops $D_Q$ and $D_S$ to the clear input of COUNT2; a counter COUNT3 the input of which is connected to the output of DEC5 and which is also connected to an inverted clear input of COUNT3; a decoder DEC > 2 connected to the output of COUNT3; an output latch $L_{SS}$ of DEC $\geq$ 2 having a clear input connected to a SYNERR output of DEC > 15.

The function of DT(DTI) and SYNCK (SYNCKI) is as follows. Initially is assumed that MOR (FIG. 4) (MORI FIG. 5) is in a not synchronized position and that the output of $D_S$ is false. The output of 07 is then false and locks COUNT1 in a start position. 06 supplies a true output and opens DEC5. Through IREG is passed continuously the bit stream transmitted by the central station and the six bits connected to DEC5 are decoded continuously. When the bit sequence of a SYN character is detected the flip-flop $D_S$ is set and COUNT1 is started via 07 in module 6. The continuous decoding operation of DEC5 is interrupted. COUNT3 of SYNCK is stepped forward one step by the output of DEC5. When position six is reached by COUNT1 this opens again DEC5 and if the character stored in IREG is a SYN then a true output is supplied from both $D_S$ and DEC5. COUNT3 then reaches position two and this is detected by DEC2 the true output of which is supplied to latch $L_{SS}$. $L_{SS}$ is then set and supplies the signal SS. The true output of $D_S$ also clears COUNT2 via 08.

The true output SS of $L_{SS}$ changes MOR to its synchronous position. From this follows that DEC3 is opened each time COUNT1 reaches position 4 and that DEC4 is opened for every position 6 of COUNT1.

If the second character of IREG is not a SYN, then the synchronization operation returns to decode continuously the bit stream through IREG.

If DEC3 detects a bit combination different from 1111 a true output is supplied on the output DATA and latch $L_D$ is set. If said bit combination corresponds to the own address DEC3 also supplies an output ADDR and latch $L_4$ is set. ($L_4$ may be eliminated in the DT of the central station). A true output from $L_D$ initiates modulo 12 operation of COUNT1 and DEC2 is opened. When the end of bit 12 is reached by COUNT1 a true output signal is supplied on the output end 12th bit of DEC2 and said signal clears $L_D$ and $L_4$ and COUNT1 returns to modulo 6 operation.

If the inputs of DEC are 1111 when COUNT1 is in position 4, then the character is probably a SYN or a Q. The outputs of DEC3 will remain false and COUNT1 proceeds in modulo 6 and DEC4 is opened in position 6. If the character is a Q the D flip-flop $D_Q$ is set. If the character is a SYN the D flip-flop $D_S$ is set (or reset) and COUNT3 is stepped forward to its first (or second) position as already described.

Each time position 6 (in modulo 6 operation) or position 12 (in modulo 12 operation) is reached by COUNT1 a counting pulse is supplied to COUNT2 of SYNCK. If $D_Q$ or $D_S$ is true (Q or SYN character is stored) then COUNT2 is cleared. If neither a Q nor a SYN is identified in the bit stream COUNT2 proceeds counting. When position 15 is reached DEC $>$ 15 supplies the signal SYNEER which will change MOR to a non-synchronized position and thereafter a resynchronization takes place.

Figure 7:
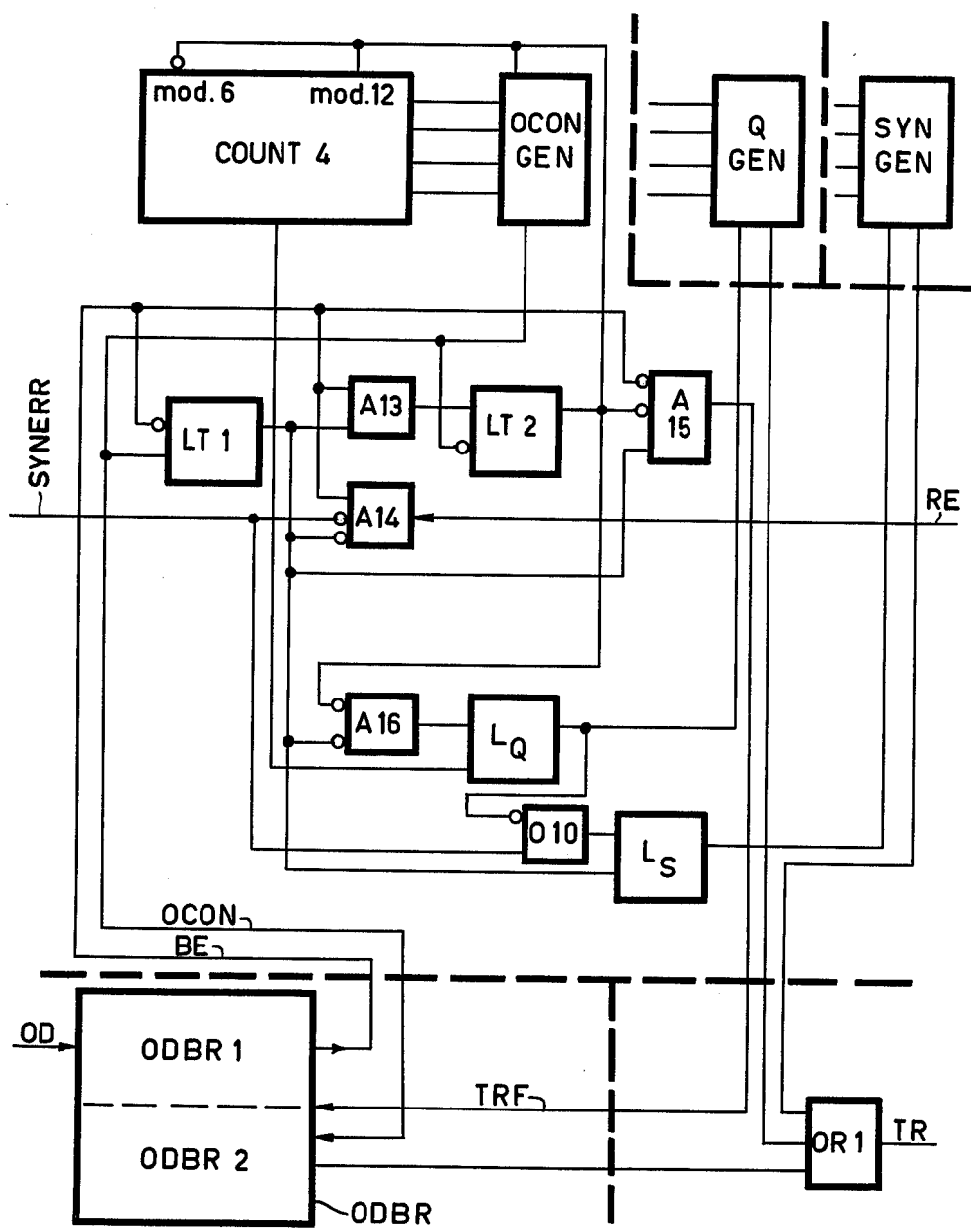
FIG. 7 discloses a circuit diagram of a control unit comprised in the transmission/reception circuit of the central station.

The central control unit CO (FIG. 5) of TRRE is disclosed in FIG. 7. CO is composed of a 4 bit counter COUNT4 which may be controlled so as to count according to a modulo 6 or a modulo 12; a time pattern generator OCON-GEN; control latch circuits, LT1 and LT2 and hold AND circuits A13, A14, A15; a control latch $L_Q$ for the control of QGEN; and a control latch $L_S$ for the control of SYNGEN.

The function of CO is as follows assuming that the loop has not been synchronized in the initial position. A high output signal is supplied from $L_S$ to SYNGEN and SYN characters are supplied to the loop continuously. When two consecutive SYN are received from the loop the SS signal appears and will then eliminate the SYNERR signal on the gate A14, the output of which goes true and supplies the signal RE(read). Thereafter output data may be supplied to ODBR on line OD.

ODBR is composed of a data latch circuit ODBR1 and a transmission buffer register ODBR2. ODBR1 is charged from the central station and after this the signal BE goes false. This condition is indicated in CO by setting of the latch LT1. The true output signal of LT1 is supplied to gate A15 which will then provide a true output signal named transfer (TRF).

Said transfer signal is supplied to ODBR and replaces therein output data from ODBR1 to ODBR2. After this transfer the BE signal again goes true and LT2 is set thereby via A13. The modulo 12 condition of COUNT4 and the OCONGEN are activated by the output of LT2. The first edge of the signal OCON resets LT1 and thereby the signal RE(read) is supplied to the central station via A14, from which it follows that ODBR is charged by a further character. During the appearance time of signal OCON 12 bits are transmitted from ODBR2 onto the line TR (FIG. 5) via 01. The final edge of OCON resets LT2 and a new transfer signal is generated if further characters have been stored in ODBR1. If not so A16 generates instead a high output which will set $L_Q$ true. QGEN is controlled by $L_Q$ and supplies a Q character to the line. The 6th pulse of COUNT4 indicates the end of the Q character and resets $L_Q$. When $L_Q$ goes false $L_S$ is set via 010 and SYNGEN starts a transmission of SYN characters until a new character is stored ODBR and LT1 is set.

In the following will be described a numerical example of a data transmission during a transfer block directed from the central station to the terminal stations 2,5 (FIG. 1) during the output data phase and from the terminal stations 3, 4 to the central station during the input data phase.

If the system is not synchronized the control unit CO will start the synchronization character generator SYNGEN, which via OR1 will transmit a number of SYN characters 11111P to the loop. Said SYN characters will circulate on the loop and then be received in IREG and DT in all terminal stations, which are thereby brought into synchronism. The SYN characters are received in IDBR of TRRE after having circulated the loop and are decoded in DTI, which will then activate its SYN output, which will in turn activate the control unit CO to send a ready signal REOD to the superior equipment, which will simultaneously receive a buffersignal and will thereby be initiated to supply an output data message into ODBR. After this input the buffer empty signal BE is terminated and thereafter the contents of ODBR may be fed on to the loop in series.

It is assumed that the address of terminal station 2 is 1000 and that said station should receive the data character 1101011P, and further it is presumed that said station is prepared for the reception of a further character during the next following output data phase, and further it is assumed that the address of the terminal station 5 is 1010 and that said station should receive the data character 1110110P. It is also assumed that the station 5 is not prepared for data reception during the next following output data phase.

The terminal stations 3 and 4 have the addresses 1100 and 0110, respectively, and should transmit the characters 0001110P and 1111001P, respectively, to the central station.

From the above assumptions follows that the output data sequence

SYNSYN10001101011P10101110110PQSYNSYN will be supplied from the central station via OR1 during the output data phase. The address portion 1000 is identified in station 2, which will then break the loop by changing SW to the position 2 in control of the signal addr.recong.supplied from DT via OR3. The data portion 1101011P is supplied into DOUT via AND1 and is inverted simultaneously while passing through AND3 and NOR1 in order to be rejoined with the address portion on the loop via OR5 and SW. Instead of the parity bit a 1 is inserted by AND4, indicating that the terminal is prepared for reception of further output data, and thereafter SW is changed to the position 1 by the signal E12BT from DT. From this follows that the sequence

...SYNSYN 10000010100110101110110PQ will appear at 0 of the terminal 2.

The address portion 1010 is identified in the terminal 5 and the operation described above is then repeated in this terminal apart from the fact that P is replace by a 0, indicating that the terminal 5 is not prepared for reception during the next following output data phase. From this follows that the bit sequence

SYNSYN100000101001101000010010Q will appear at 0 of the terminal 5.

The Q character of the output sequence is identified by the terminal stations and brings with it in the terminal stations 3 and 4 a change of the MOR register and a supply of data into DATIN via AND5 and OR2. When the data message supplied to DATIN in this manner is sensed by the circuit RNE the output signal therof goes high and changes in combination with the Q signal the switch SW to the position 2 via AND6 and OR3. When the SYN-characters following the Q-character appear at 1 in the terminal 3, said characters are fed into DATIN via AND7 and the data message 11000001110P is simultaneously fed out via OR5 and SW and into DATIN of the terminal 4, from which the data message 01101111001P is simultaneously fed forward to the loop.

After the terminal 3 has received two SYN characters, which are fed into DATIN, the SS output of DT is activated and DATIN is reset via the RT input, which in turn brings with it that a 0 is supplied from RNE which is inverted in INV and by which SW is reset to the position 1 via OR4.

The next following two SYN characters will feed out the contents of DATIN of the terminal 4, i.e. the input data message from the terminal 3, onto the loop and initiate at same time a change of the switch SW thereof to the position 1.

From the functions described follows that the bit sequence

...SYNSYN
10000010100110100001001Q01101111001P
1100000110PSYNSYN...

will appear at RE in the central station, the SYN character in the beginning of said sequence initiates an activation of the SYN output of DT1 and thereby the MOR1 register is set so that the reception path through AND9 is opened. From this follows that the bit sequence

10000010100110100001001 will appear at REOD1 in the central station. The Q character of the RE sequence initiates a change of the MOR1 register so that the receiving path through AND8 is opened and thereby the bit sequence

01101111001P11000001110P will appear at D1 in the central station.

What is claimed is:

1. A method for transmission of data between a central station and a number of terminal stations which are connected to a closed series transmission loop provided between the output and the input of the central station, in which the transmission is carried out bit-by-bit in one and the same direction through the loop under control of the central station and in which all data is transferred in the form of a transmission block having an output data phase, a general polling character and in input data phase, each output and input data phase having a data message, which comprises the steps of providing the data message with an address portion comprising a predetermined number of bits indicating in a binary code the address of the terminal station associated with the data message; providing the data message during an output data phase, at least one data message being transmitted by the central station to the terminal stations to which the central station has output data to send during the output data phase; providing the transmission block with a general polling character from the central station at the end of the output data phase for preparing the terminal stations having input data to send for transmission; and providing the transmission block with an input data phase after the general polling character, at least one data message being transmitted to the central station during the input data phase by each of the terminal stations prepared in this manner; and providing a subsequent transmission block, also comprising an output data phase, a general polling character and an input data phase, the subsequent transmission block being initiated by the central station when the end of the earlier input data phase is sensed, the lengths of the output and the input phases always being adapted to the actual data transfer need.

2. A method as claimed in claim 1, wherein during the output data phase each of the output data messages is sent forward on the loop and back to the central station after the data portion thereof has been modified by the receiving terminal station, the modification being carried out without breaking the continuity of the message bit sequence appearing on the loop.

3. A method as claimed in claim 2, wherein said modification comprises inversion of all the bits of the data message.

4. A method as claimed in claim 2, in which the data portion of each data message is finished by a parity bit, wherein the modification comprises a change of the parity bit so as to indicate whether or not the terminal station is prepared to receive output data during the next following output data phase and that the remaining bits of the data portion are inverted.

5. A method as claimed in claim 2, wherein the modification comprises replacing the data portion of the data message by new input data.

6. A method as claimed in claim 1, wherein the central station and each of the terminal stations after recognizing a parity error of a received data message will send during the next following transfer phase a data message the data portion of which comprises a parity error indicating control character, and wherein said control character will initiate a repeated transmission of the erroneous data message during the next following transfer phase.

7. A method as claimed in claim 1, wherein the central station is arranged to transmit a continuous sequence of synchronizing control characters when there is no other transmission, in which the sequence of synchronizing control characters is used as a filling for the line delay of the transfer loop, and wherein the central station will initiate transmission of the next following output data phase after having received one of said synchronizing control characters which has circulated on the loop.

8. A method as claimed in claim 7, wherein each of the terminal stations not recognizing with a predetermined regularity the polling character or one of the synchronizing control characters being transmitted at each transmission block by the central station will fall out of synchronism and thereafter await a new synchronization by the synchronizing control characters which are transmitted by the central station in connection with the next following transfer block.

9. A system for the transmission of data between a central station and a number of terminal stations which are connected to a closed series transmission loop provided between the output and the input of the central station, the transmission of data being carried out bit-by-bit in one and the same direction through the loop under the control of the central station, which system comprises means for forming a data transmission block, means for providing said data transmission block with an output data phase during which at lest one data message is transmitted by the central station to the terminal stations to which the central station has output data to send, the output data phase having an address portion comprising a predetermined number of bits indicating in a binary code the address of the terminal station associated with the data message, means for providing said data transmission block with a general polling character from the central station at the end of the data phase for preparing the terminal stations having input data to send for transmission, and means for providing said data transmission block with an input data phase after the general polling character, at least one data message being transmitted to the central station during the input data phase by each of the terminal stations, and means for providing a subsequent data transmission block, also comprising an output data phase, a general polling character and an input data phase, the subsequent transmission block being initiated by the central station when the end of the earlier input data phase is sensed, the lengths of the output and the input data phases always being adapted to the actual data transfer need, each of the terminal stations comprising a controllable 2-position switch having a first position in which the terminal station is bridged and a second position in which an output from the terminal station is connected in series with the loop, and a decoding and timing circuit for generating time control signals by decoding the contents of an input register which is connected permanently to the loop and by recognizing the symbols appearing on the loop control signals for the control of the terminal station during an output data phase and input data phase.

10. A system as claimed in claim 9, wherein the decoding and timing circuit comprises means for generating, during an output data phase after recognizing the address of the terminal station, a first control signal for changing the 2-position switch to the second position thereof so that the loop is opened and the data portion of the data message is supplied to a reception register, said data portion being simultaneously passed through said modification circuit and rejoined to the address portion on the loop, and for generating, at the end of the data message, a second control signal for resetting the 2-position switch to its first position.

11. A system as claimed in claim 9, wherein each of the terminal stations comprises means for generating a status signal which is high or low dependent on whether the transmission register holds a data message, the decoding and timing circuit, when receiving a polling control character, will generate a third control signal which in combination with a high status signal will change the 2-position switch to the second position and connect the transmission register in series with the loop via connection means, further control means being provided for generating a control signal for resetting the 2-position switch to the first position after the transmission register has been reset.

12. A system as claimed in claim 10, wherein each of the terminal stations comprises a parity check circuit for a parity check of the contents of the reception register, a control means, which when the parity check is acknowledged will supply the contents of the reception register to reception means provided for this purpose in the terminal, and which when the parity check is not acknowledged will supply a no-acknowledgement signal to the transmission register to be sent as an input data message during the next following input data phase.

13. A system as claimed in claim 9, wherein each of the terminal stations comprises a synchronization check circuit arranged so as to, dependent on output signals from the decoding and timing circuit, check if the polling character or the synchronizing control character is received at a predetermined minimum frequency in the input register, and to take the terminal out of synchronism when this condition is not met and then to reset the relevant registers of the terminal.

14. A system as claimed in claim 9, wherein the central station comprises a control unit for controlling the transmission of information and control characters dependent on information which is received from the loop, a synchronizing generator which is controlled by the control unit, and a polling character generator which is controlled by the control unit, the output of said generators being connected together with the output of an output data buffer register to the output of the central station via a transmission gate.

15. A system as claimed in claim 14, wherein the central station comprises a decoding and timing circuit for the control of the information received from the loop, in which the decoding and timing circuit will generate a first enabling control signal to a first gate member at the reception of output data messages which have circulated the loop while being modified by the actual terminal stations, and a second enabling control signal to a second gate member at the reception of input data messages from the terminal stations.

16. A system as claimed in claim 15, wherein the decoding and timing circuit of the central station comprises means for generating a control signal by which the control unit starts the output data phase of the next following transfer block when a synchronizing control character in the input data buffer register is recognized.

* * * * *